(12) United States Patent
Anna et al.

(10) Patent No.: US 7,080,277 B2
(45) Date of Patent: Jul. 18, 2006

(54) METHOD AND APPARATUS FOR RECOVERY OF A LOGICAL VOLUME IN A MULTI COPY STORAGE SYSTEM

(75) Inventors: Josephina Anna, Tucson, AZ (US); Kevin Lee Gibble, Tucson, AZ (US); Gregory Tad Kishi, Oro Valley, AZ (US)

(73) Assignee: International Business Machines Corporation, Armonk, NY (US)

(*) Notice: Subject to any disclaimer, the term of this patent is extended or adjusted under 35 U.S.C. 154(b) by 579 days.

(21) Appl. No.: 10/231,359

(22) Filed: Aug. 29, 2002

(65) Prior Publication Data

US 2004/0078639 A1 Apr. 22, 2004

(51) Int. Cl.
*G06F 11/00* (2006.01)

(52) U.S. Cl. .......................................... 714/2

(58) Field of Classification Search .................... 714/2, 714/6, 7, 13, 15, 42; 711/162, 6, 165; 709/214, 709/225
See application file for complete search history.

(56) References Cited

U.S. PATENT DOCUMENTS

| | | | |
|---|---|---|---|
| 4,755,928 A | 7/1988 | Johnson et al. | 364/200 |
| 5,459,857 A * | 10/1995 | Ludlam et al. | 714/6 |
| 5,875,478 A | 2/1999 | Blumenau | 711/162 |
| 5,926,836 A | 7/1999 | Blumenau | 711/162 |
| 5,940,849 A | 8/1999 | Koyama | 711/4 |
| 6,023,709 A | 2/2000 | Anglin et al. | 707/204 |
| 6,029,179 A | 2/2000 | Kishi | 707/202 |
| 6,105,037 A | 8/2000 | Kishi | 707/201 |
| 6,173,359 B1 | 1/2001 | Carlson et al. | 711/111 |
| 6,226,759 B1 * | 5/2001 | Miller et al. | 714/6 |
| 6,243,796 B1 | 6/2001 | Otsuka | 711/159 |
| 6,269,423 B1 | 7/2001 | Kishi | 711/113 |
| 6,269,431 B1 * | 7/2001 | Dunham | 711/162 |
| 6,275,953 B1 * | 8/2001 | Vahalia et al. | 714/11 |
| 6,317,814 B1 | 11/2001 | Blendermann et al. | 711/162 |
| 6,336,163 B1 | 1/2002 | Brewer et al. | 711/112 |
| 6,477,666 B1 * | 11/2002 | Sanchez et al. | 714/6 |
| 6,549,992 B1 * | 4/2003 | Armangau et al. | 711/162 |
| 6,604,171 B1 * | 8/2003 | Sade | 711/113 |
| 6,816,891 B1 * | 11/2004 | Vahalia et al. | 709/214 |
| 2004/0153604 A1 * | 8/2004 | Nagasawa et al. | 711/113 |

* cited by examiner

*Primary Examiner*—Nadeem Iqbal
(74) *Attorney, Agent, or Firm*—Kunzler & Associates (57) ABSTRACT

A system, apparatus, and method to recover a logical volume on a physical volume, or data storage cartridge, within a dual copy data storage system, such as a virtual tape server (VTS) system. Such recovery follows a disaster situation involving a primary copy of the requested logical volume. The system, apparatus, and method include modules and steps as required to recover a logical volume, or data file or block, through manipulation and swapping of record files, or stubs, that point to primary and secondary copies of a logical volume. Such primary and secondary logical volumes are stored on distinct physical volumes in order to provide quality storage media management and reduce the likelihood of loss of data. The recovery and swapping procedures are implemented in a manner that is substantially transparent to a host or client requires no additional input from the host or client

26 Claims, 6 Drawing Sheets

METHOD AND APPARATUS FOR RECOVERY OF A LOGICAL VOLUME IN A MULTI COPY STORAGE SYSTEM

BACKGROUND OF THE INVENTION

1. The Field of the Invention

The invention relates to dual copy data storage systems and more particularly to the recovery of a logical volume using primary and secondary records that point to primary and secondary logical volumes, respectively, within a virtual tape server (VTS) system.

2. The Relevant Art

High density, removable media storage libraries are used to provide large quantities of storage in a computer system. Typically, such data storage systems are employed for backup or other secondary storage purposes, but may be used as primary storage in circumstances that are conducive to sequential data access and the like.

The data is stored on media cartridges, such as magnetic or optical disks, that are arranged in storage bins and accessed when data on a cartridge is requested. Currently available media cartridges are capable of storing much more data than the data volume units that correspond to the size of early types of media cartridges. For example, a data volume that corresponds to a 400 megabyte disk may now be stored on a disk with up to 60 gigabytes of storage capacity. Unfortunately, much legacy equipment in existing computer systems is configured for the smaller volume sizes.

Volume mapping is used to create a correlation between the physical capacity of a storage cartridge (stack volume or physical volume) and the data storage unit size (virtual volume or logical volume) of a file or block that is stored on the cartridge. Given the available data storage capacity of a disk, such mapping allows multiple logical volumes to be stored on a single physical volume, hence providing an efficient use of the available storage media. A virtual tape server (VTS) is one device capable of creating and maintaining such mapping among physical volumes and logical volumes.

A typical VTS system includes a virtual tape server and an automated media library. The library is controlled by a library manager (LM) that is similar to a workstation computer. Within the VTS system, there are typically two databases that reside on separate memory disks within the system. One database resides on the VTS and the other resides within the library manager.

The VTS database contains the logical-to-physical volume mapping, as well as information concerning actions to be taken on a logical volume each time it is copied to the storage media. One of the attributes included in such information is the requirement to produce a secondary copy of a logical volume when it is written.

The LM database also contains attributes associated with the logical volumes stored on the media cartridges. Included in these attributes are the construct names associated with each logical volume in the library. The LM also controls the physical loading of media cartridges in corresponding drives by storing the physical location of the physical volumes within the storage bins and controlling a robotic accessor arm to retrieve the physical volumes from the bins and load the cartridges in the drives when a host request is received.

Through proper communication of the volume mapping and attributes, or constructs, a host processor and peripheral data storage equipment may access logical volumes as though they were individual physical volumes. The volume access management is provided via the VTS and LM as described above.

In certain circumstances, it may be desirable to make two copies of a single logical volume. It may also be desirable to store such copies on multiple physical volumes, such as on separate cartridges or even in separate geographic locations, so as to avoid loss due to failure of a single tape or tape drive unit. Additionally, it is desirable to provide a method of recovering the secondary copy of the logical volume if, for some reason, the primary copy becomes unavailable. Some systems and methods have been proposed to recover a secondary copy of a logical volume in a dual copy storage system. Unfortunately, a number of deficiencies exist in such known systems and methods.

For example, many known dual copy systems require an explicit command from the host to initiate recovery of a secondary copy. The software running on the host must be modified to provide the recovery command. As a result, such a recovery system may be difficult to use with existing (legacy) software. Consequently, adding recovery capability to an existing system may be rather difficult. Such recovery systems may also require that the host transmit the data to the VTS repeatedly in order to recover the secondary copy. Thus, the I/O resources of the host are unduly taxed.

Furthermore, some dual copy systems require the host to track the locations, i.e., the physical media cartridges, of the logical volumes. This may require the maintenance of a special database on the host to hold Meta data for each file stored in the VTS. Again, such recovery systems are difficult or impossible to incorporate into existing host systems without providing new host software, and may unduly tax the resources of the host. Additionally, such a system may be difficult to use in a heterogeneous environment, i.e., with host computers that use different operating systems, file formats, etc.

Thus, it would be an advancement in the art to provide a virtual tape system capable of recovering a secondary copy of a logical volume in a manner that is substantially transparent to the host. It would further be an advancement in the art to provide a virtual tape system capable of efficiently recovering a logical volume independent of the host. Yet further, it would be an advancement in the art to provide a virtual tape system that minimizes the VTS resources required to recover the secondary copy.

BRIEF SUMMARY OF THE INVENTION

The present invention has been developed in response to the present state of the art, and in particular, in response to the problems and needs in the art that have not yet been fully solved by currently available logical volume recovery means and methods in dual copy data storage systems. Accordingly, it is an overall objective of the present invention to provide a dual copy data storage system and apparatus, as well as a logical volume recovery method that overcome many or all of the above-discussed shortcomings in the art.

To achieve the foregoing objectives, and in accordance with the invention as embodied and broadly described herein in the preferred embodiments, a system, apparatus, and method for recovering a logical volume in a dual copy storage system is presented and described herein.

The logical volume recovery apparatus, in the described embodiments, is provided with a logic unit containing a recovery module configured to implement a recovery action to recover a secondary logical volume in response to a failure to access a primary logical volume.

According to one embodiment, the virtual tape system includes a virtual tape server (VTS) in communication with an automated media library unit, including a plurality of tape drive units and a library manager. The VTS receives the logical or "virtual" volumes and stores them for subsequent transmittal to the host via a storage area network (SAN) or to a plurality of physical, or stack, volumes via the tape drive units. The library manager controls the physical loading of physical volumes, i.e., media cartridges, into the tape drive units by controlling a robotic accessor arm that retrieves the physical volumes and loads them into the tape drive units in response to a request from the host or VTS.

The VTS includes a direct access storage device (DASD) that may exist on a hard disk drive system, or the like, and which serves as a cache for the VTS. Additionally, the VTS has a file system manager that interacts with a DASD cache to store information.

Each logical volume has one or more constructs associated with it, which are preferably received from the host. The constructs may associate certain volume management actions with specific logical volumes. The volume management actions preferably at least specify where virtual volumes should be physically stored, including secondary locations if dual copying of the volume is to be performed. Such primary and secondary locations are recorded in record files, or stubs, within the VTS cache. According to one embodiment, the primary record file is stored in a volume root directory while the secondary record is stored in a secondary directory that is preferably distinct from the root directory.

Upon encountering a failure to access a primary copy of a logical volume, the VTS attempts to recover the secondary copy of the logical volume through swapping the primary and secondary record locations. A recovery module is employed to perform the record swapping. For example, the secondary record is copied to the volume root directory and the primary record is copied to the secondary directory. The record swapping is preferably performed by the recovery module in a manner that is substantially transparent to the host and requires no additional user input.

A method of the present invention is also presented for logical volume recovery. The method attempts to access a primary logical volume from a physical cartridge. When the VTS determines that the primary volume is inaccessible, the VTS attempts to recover the secondary copy of the requested volume.

To achieve the stated recovery, the VTS in one embodiment verifies the availability of a secondary record in the corresponding volume secondary directory. If the secondary record is located and determined to point to a logical volume that is an exact copy of the requested primary logical volume, the VTS proceeds to swap the location of the primary record and secondary record such that the secondary record overwrites the primary record in the root directory. Similarly, the primary record may overwrite the secondary record in the secondary directory.

The swapping procedure is followed by a subsequent attempt by the VTS to access a copy of the requested logical volume. In one embodiment, such attempt allows the VTS to access the secondary record in the root directory to locate the secondary copy of the requested logical volume. Once located, the secondary physical volume is loaded into a tape drive unit so that the secondary logical volume may be loaded into the VTS cache and made available to the host. After the host access to the secondary logical volume is successful, the VTS replaces the original primary logical volume with a cached copy of the logical volume. A new secondary volume may also be created at this point.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objectives of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
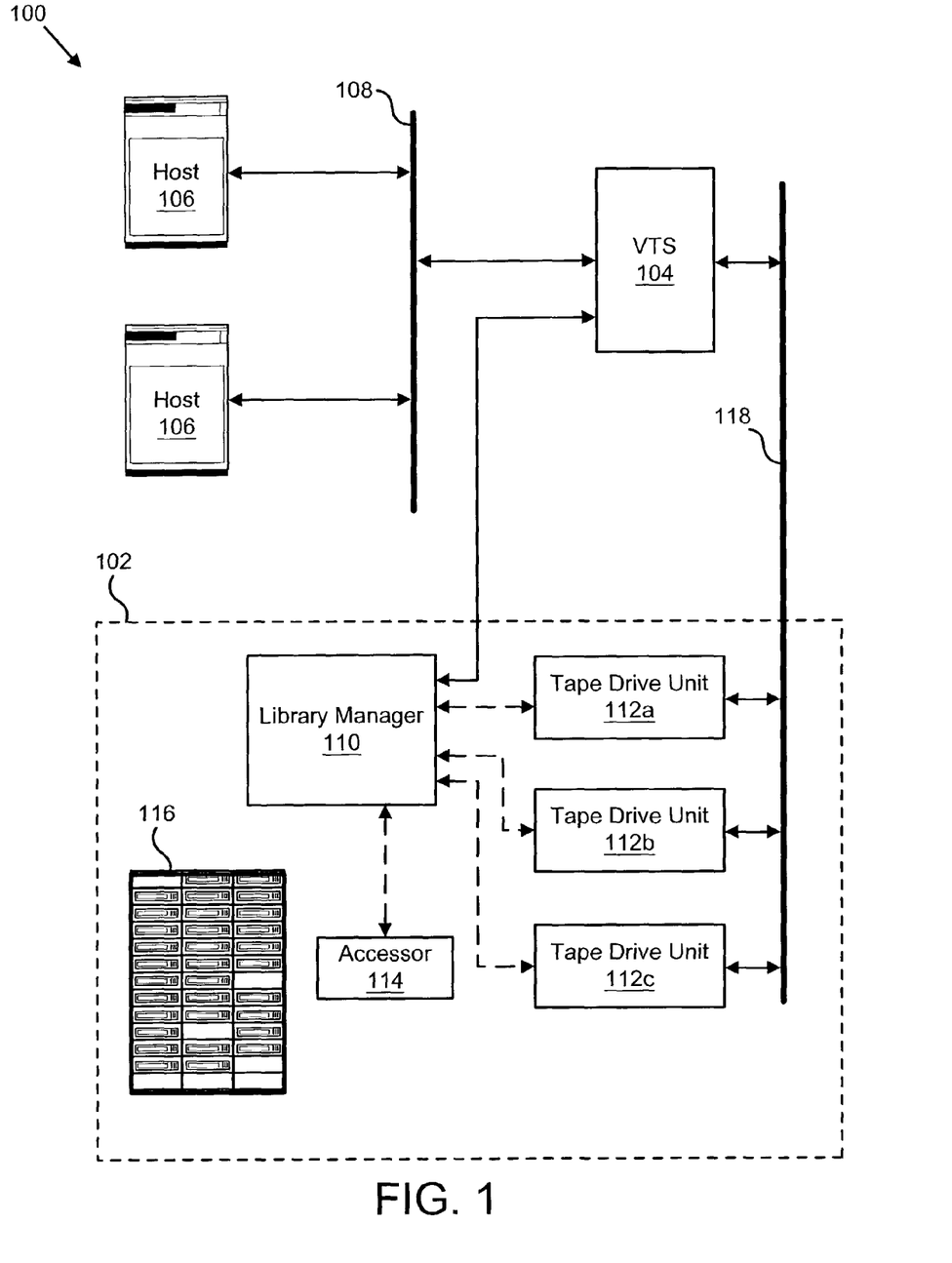
FIG. 1 is a schematic block diagram illustrating one embodiment of a representative virtual tape system.

FIG. 1 illustrates a schematic block diagram of one embodiment of a representative virtual tape system 100 in accordance with the present invention. The system 100 includes an automated library unit 102, at least one VTS 104, and at least one host 106. Each host 106 may be a mainframe computer. Alternatively, the hosts 106 may be servers or personal computers using a variety of operating systems. The host 106 and the VTS 104 are connected via a storage area network (SAN) 108 or similar communications channel.

The automated tape library unit 102 includes a library manager 110, one or more data drive devices, which may be tape drive units 112, an accessor 114, and a plurality of media cartridges 116. The plurality of media cartridges 116 may be stored in one or more media cartridge storage bins (not shown).

The library manager 110, which includes at least one computing processor, is interconnected with, and controls the actions of, the tape drive units 112 and the accessor 114. The library manager 110 typically also includes one or more hard disk drives (not shown) for memory storage, as well as, a control panel or keyboard (not shown) to provide user input. The control panel may be a computer in communication with the library manager 110 so that a user can control the operating parameters of the automated tape library unit 102 independently of the host 106.

In FIG. 1, three tape drive units 112a, 112b, and 112c are shown. The present invention is operable with one or any larger number of tape drive units 112. The tape drive units 112 may share one single repository of cartridges 116. Alternatively, the tape drive units 112 may independently correspond to and utilize multiple repositories of cartridges 116. The tape drive units 112 may advantageously be distributed over multiple locations to decrease the probability that multiple tape drive units 112 will be incapacitated by a disaster in one location.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the VTS 104 and the tape drive units 112 via a network 118, which may be a storage area network (SAN), a local area network (LAN), wide area network (WAN), or a different type of network, such as the Internet or a direct connection between the VTS 104 and the tape drive units 112.

The accessor 114 may be a robotic arm or other mechanical device configured to transport a selected cartridge 116 between a storage bin and a tape drive unit 112. The accessor 114 typically includes a cartridge gripper and a bar code scanner (not shown), or similar read system, mounted on the gripper. The bar code scanner is used to read a volume serial number (VOLSER) printed on a cartridge label affixed to the cartridge 112. In alternative embodiments, the tape drive units 112 may be replaced by optical disk drives or other magnetic drives. Similarly, the cartridges 116 may contain magnetic media, optical media, or any other removable media corresponding to the type of drive employed.

Figure 2:
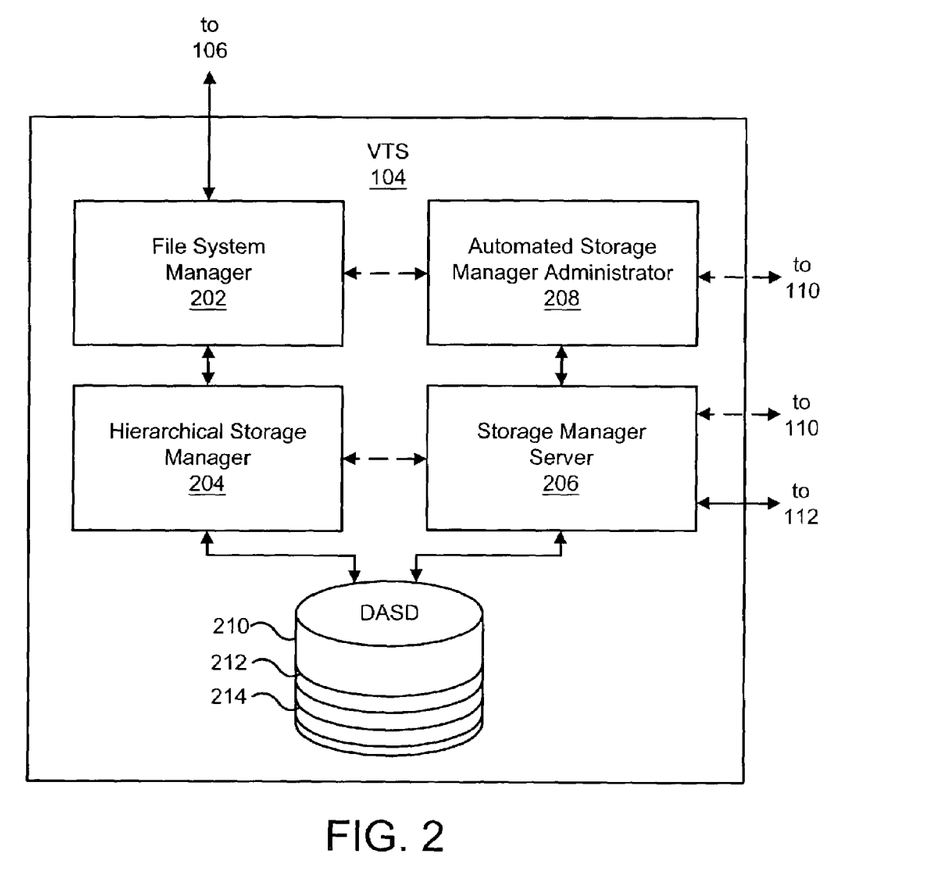
FIG. 2 is a schematic block diagram illustrating one embodiment of a representative virtual tape server (VTS) suitable for use with the virtual tape system of FIG. 1.

FIG. 2 illustrates a schematic block diagram depicting one embodiment of the VTS 104 of FIG. 1. The VTS 104 may take the form of a computer with a bus, processor, memory, and the like. These elements have been omitted from FIG. 2 to more clearly depict the various executable modules and data blocks of the VTS 104.

As shown, the VTS 104 includes a file system manager 202, a hierarchical storage manager 204, a storage manager server 206, an automated storage manager administrator 208, and at least one direct access storage device (DASD) cache 210. The DASD cache 210 may take the form of one or more virtual tape drives to contain data in the form of a logical, or virtual, volume 212 and a data record 214. Other executable modules and data blocks may also be present but are omitted to focus on the present invention.

The file system manager 202 handles the actual DASD 210 read and write commands from the host 106, in one embodiment, via the hierarchical storage manager 204. The storage manager server 206 controls the interface communications between the DASD 210 and the drive devices 112. The storage manager server 206 is controlled by the automated storage manager administrator 208. The automated storage manager administrator 208 monitors and directs the operation of the file system manager 202, the hierarchical storage manager 204, and the storage manager server 206, and communicates control information to and from the library manager 110.

The DASD cache 210 is used to hold a plurality of logical, or virtual, volumes 212 from the physical volumes, or memory cartridges 116. A read or write command from the host 106 is processed by the VTS 104 via the DASD 210 prior to transferring the updated logical volume 212 from the DASD cache 210 to the physical volume 116.

Figure 3A:
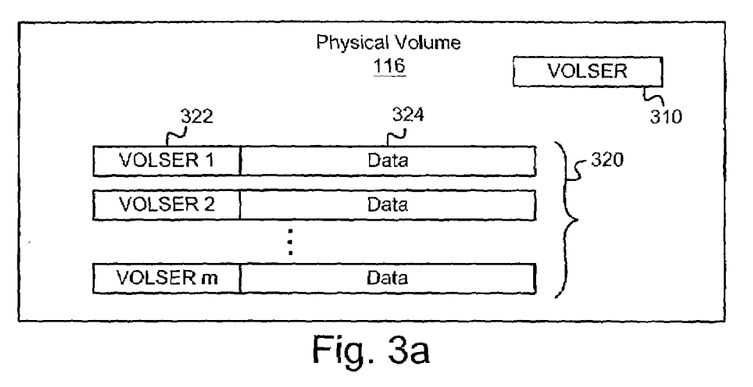
FIG. 3*a* is a schematic block diagram illustrating one embodiment of a representative physical volume suitable for use in the automated library unit of FIG. 1.

Referring to FIG. 3a, a schematic block diagram illustrates one embodiment of a physical volume 116. The physical volume 116 includes a VOLSER 310 that is logically stored within the volume and distinctly identifies the individual physical volume from other physical volumes maintained in the storage bin. The VOLSER 310 is also physically printed on the exterior of the media cartridge 116 for scanning or other reading by the accessor 114.

Also stored on the physical volume 116 are one or more logical volumes 320 that are of a memory size equal to or less than the overall memory capacity of the physical volume 116. Alternatively, the physical volume 116 may also contain only a subset of the logical volume 320. Each logical volume 320 includes a VOLSER 322 and data 324. The plurality of logical volumes 320 stored on the physical volume 116 may include both primary volumes and secondary volumes. Preferably, the secondary volumes are stored on a physical volume 116 separate from the physical volume that stores the primary volumes.

Figure 3B:
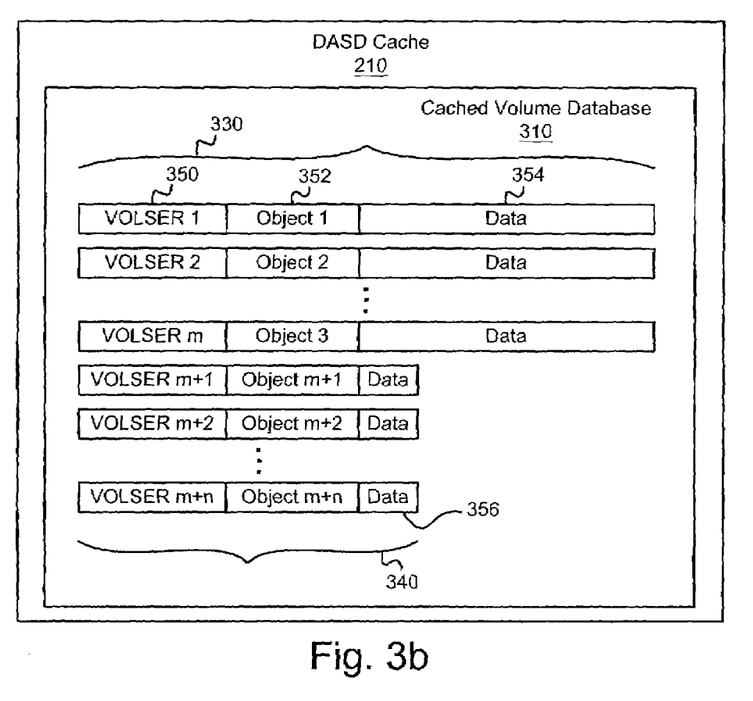
FIG. 3*b* is a schematic block diagram illustrating one embodiment of a representative DASD cache, a cached volume database, and a plurality of data structures, the DASD cache suitable for use with the VTS of FIG. 2.

Referring to FIG. 3b, the contents of the DASD cache 210 are depicted. The DASD cache 210 contains a cached volume database 310 in which virtual volumes 212 are stored in the form of files or blocks, subsequently referred to simply as files.

More specifically, the cached volume database 310 has a plurality of files 330, each of which contains an entire logical volume 212 of data received from the host 106 or the tape drive units 112. Additionally, the cached volume database 310 has a plurality of volume records 340, or stubs. Each of the files 330 has a header containing a VOLSER 350 and an object identifier 352.

The VOLSER 350 is used to refer to the virtual volumes 212. The VOLSER 350 may or may not be the same as the VOLSER 310 of the cartridge 116. For example, if each cartridge 116 contains only a single virtual volume 320, the VOLSER 322 of such virtual volume 320 may be the same as the VOLSER 310 of the corresponding physical volume 116. However, different VOLSERs 322 may be necessary if each cartridge 116 contains multiple virtual volumes 320. The object identifier 352 is used by the library manager to map the physical location of a physical volume 116 within the automated tape library unit 102 to the virtual volume 212 within the DASD cache 210. Each file 330 also has data 354, which is the actual data to be stored to or retrieved from the cartridges 116.

The records 340 are files that have been truncated. Such records 340 may also be commonly referred to in the art as stubs. More precisely, each of the records 340 may include only the VOLSER 350, the object identifier 352, and optionally, a small data portion 356 of the virtual volume 212. The records 340 are each limited to a standard size, such as 4,096 bytes. Since the capacity of the DASD cache 210 is limited, only a limited number of complete logical volume files 330 can be virtually stored in the cache 210. The remaining files are truncated to form the logical volume records 340, which require significantly less memory in the cache 210 than do the logical volume files 330. The records 340 point to the appropriate logical volumes 320 stored on the physical volumes 116 for future retrieval as requested by the host 106.

The determination of which files 330 are to be truncated to form records 340 is made by a cache management algorithm (not shown) that determines the likelihood that a given logical volume 212 will soon be needed by the host 106. Files 330 are truncated if they are determined to be less likely to be read or written to in the near future.

Thus, if a desired logical volume 320 is stored only as a volume record 340 in the DASD cache 210, the VTS 104 may use the object identity 352 for the desired logical volume 320 to locate the corresponding physical volume 116. The physical volume 116 is then loaded into a tape drive unit 112 via control signals from the library manager 110, and the logical volume 320 can be read into the DASD cache 210 to retrieve the data 354 for the volume record 340, thereby restoring the virtual volume 212.

Figure 4:
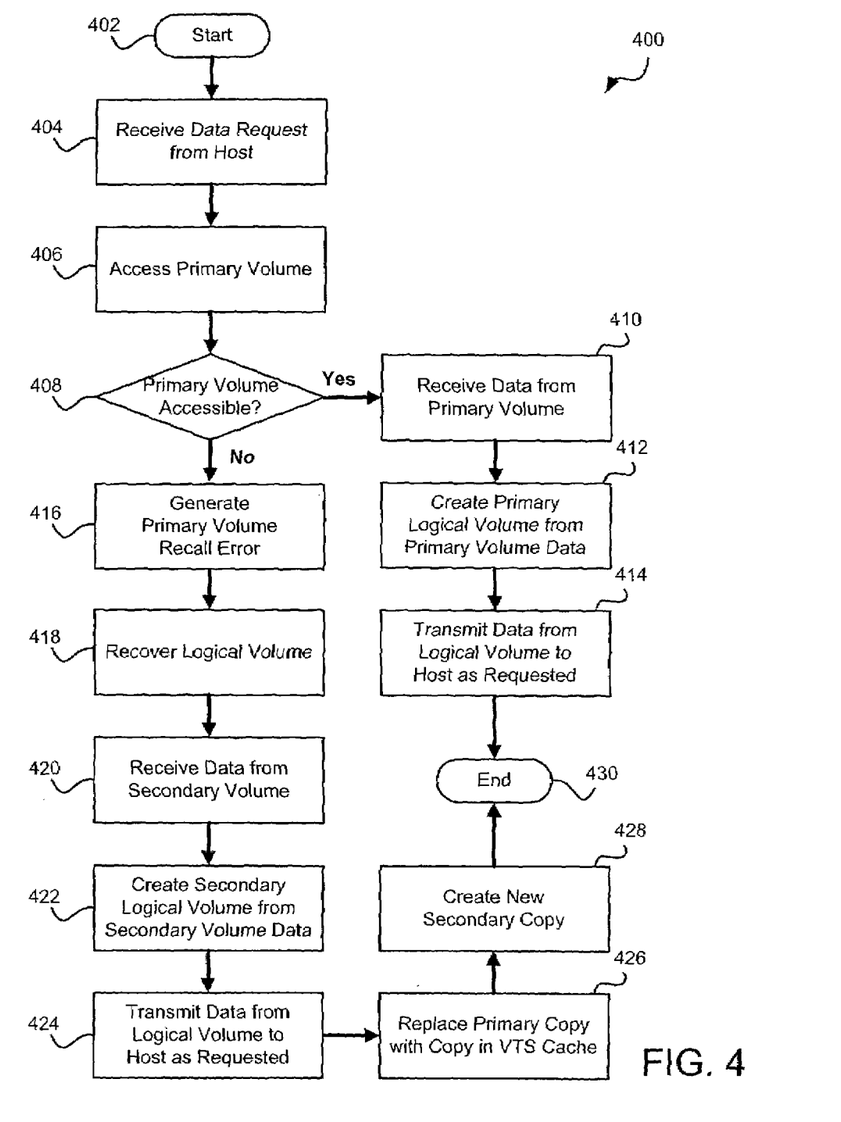
FIG. 4 is a schematic flow chart diagram illustrating one embodiment of a representative logical volume access method for use in accordance with the present invention.

Referring to FIG. 4, a schematic flowchart diagram depicts one embodiment of a logical volume access method 400 that may be employed by the system 100 according to the invention. The method 400 starts 402 by receiving 404 a data request in the VTS 104 from the host 106. The data request preferably includes the VOLSER 350 corresponding to the data 354 requested by the host 106. The VTS 104 attempts to access 406 the primary volume.

The method 400 tests 408 if the primary volume access is successful. If the method 400 tests 408 positively, the VTS 104 retrieves 410 the data 354 in the logical volume 320 that was requested by the host 106 from the physical volume 116 indicated by the VOLSER 350. The VTS 104 then creates 412 a logical volume 212 of the data 354 in the DASD cache 210 and transmits 414 the requested data 354, or portion thereof, from the logical volume 212 to the host 106, or vice-versa, in order to process the volume access request.

If the test 408 determines that the primary volume is inaccessible, the method 400 generates 416 a primary volume recall error signal within the VTS 104. Upon receipt of the error signal, the VTS 104 attempts to recover 418 the logical volume 320 through accessing a secondary copy of the primary volume. A more detailed explanation of conducting one embodiment of a recover step 418 is explained in more detail in conjunction with FIG. 5.

After the VTS 104 recovers 418 the secondary volume the VTS 104 retrieves 420 the data 354 in the logical volume 320 that was requested by the host 106 from the physical volume 116 indicated by the VOLSER 350. The VTS 104 then creates 422 a logical volume 212 of the retrieved data 354 in the DASD cache 210 and transmits 424 the requested data 354, or portion thereof, from the logical volume 212 to the host 106, or vice-versa, in order to process the volume access request. This step 424 is substantially similar to the step 414 discussed previously.

After the VTS 104 transmits 414 the appropriate data to the host 106, the VTS 104 in one the illustrated embodiment replaces 426 the original primary logical volume with a cached copy of the logical volume 212. Additionally, a new secondary logical volume 212 may also be created 428 at this point as depicted. The method 400 then ends 430.

Figure 5:
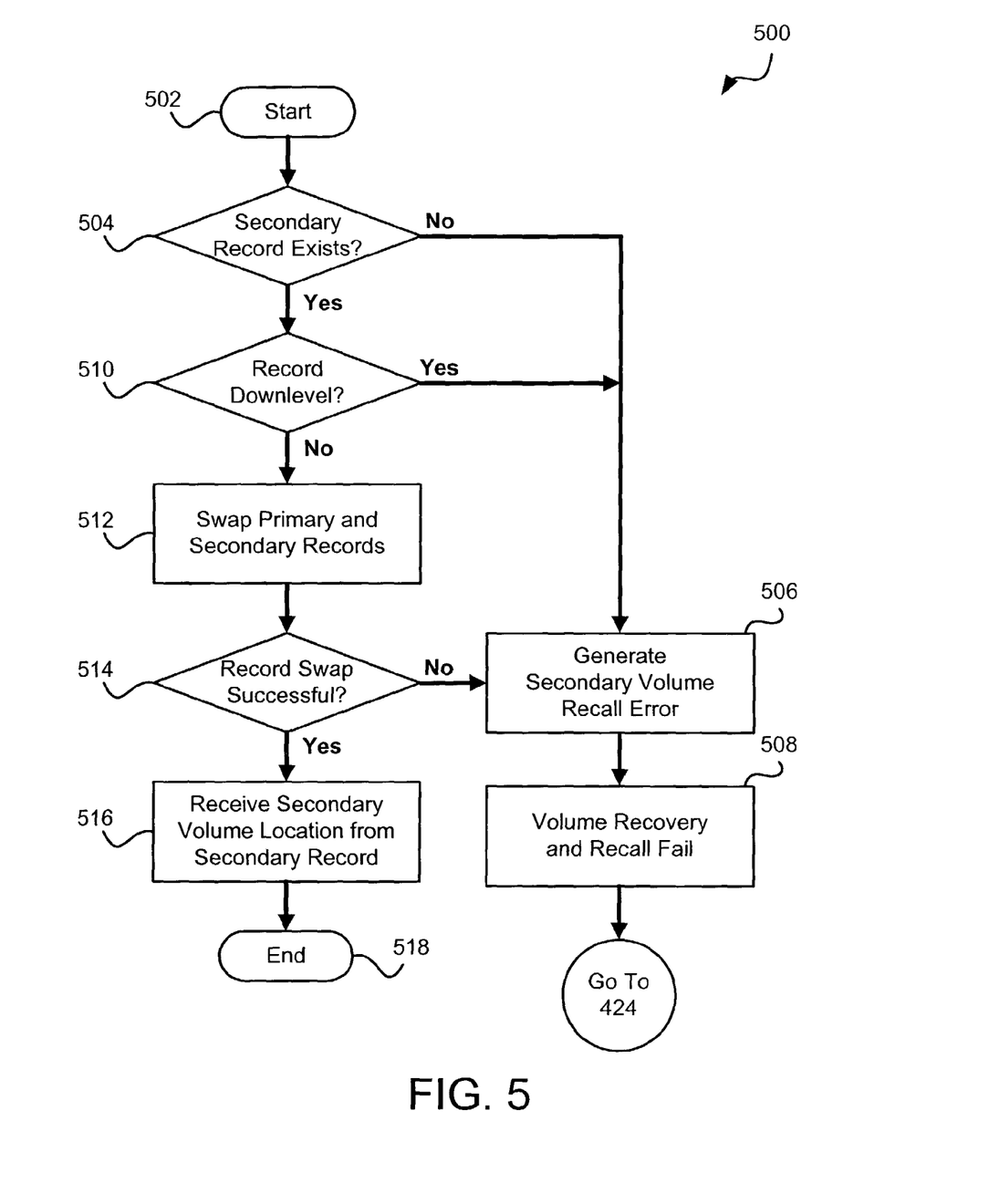
FIG. 5 is a schematic flow chart diagram illustrating one embodiment of a representative logical volume recovery method given by way of example of a logical volume recovery step of FIG. 4.

Referring to FIG. 5, a schematic flow chart diagram depicts one embodiment of a logical volume recovery method 500 given by way of example of a logical volume recovery step 418 of FIG. 4. The method 500 begins 502 by determining 504 if a secondary record 340 exists in the DASD cache 210. If the VTS 104 determines 504 that a secondary record 340 does not exist, the VTS 104 generates 506 a secondary volume recall error and the secondary volume recovery and recall fail 508. The method 500 then proceeds with step 424 described previously.

If it is determined 504 that a secondary record 340 exists, the VTS 104 determines 510 if the secondary record 340 is downlevel of the primary record 340. A secondary record 340 is downlevel of a primary record 350 if the secondary record 340 points to a logical volume 320 that older than and not equivalent to the logical volume 212 indicated by the primary record 340. The recovery of a downlevel secondary record 340 would create confusion for the host 106 and provide outdated data 354 for access. Therefore, if the VTS 104 determines 510 that the secondary record 340 is downlevel, the method 500 proceeds with step 506 described previously.

If the VTS 104 determines 510 that the secondary record 340 is not downlevel, the VTS 104 performs a swap 512 of the primary and secondary records 340. This swap 512, in one embodiment, is explained in more detail in conjunction with FIG. 6.

After the VTS 104 attempts to swap 512 the primary and secondary records 340, the method 500 determines 514 if the swap 512 procedure is successful. If the swap 512 is not successful, the method 500 proceeds with step 506 described previously. If the swap 512 is successful, the VTS 104 receives 516 the secondary file location from the secondary record 340 corresponding to the secondary logical volume 320. This may be accomplished by finding the object identity 352 that corresponds to the VOLSER 350 within the secondary record 340. The method 500 then ends 518.

Figure 6:
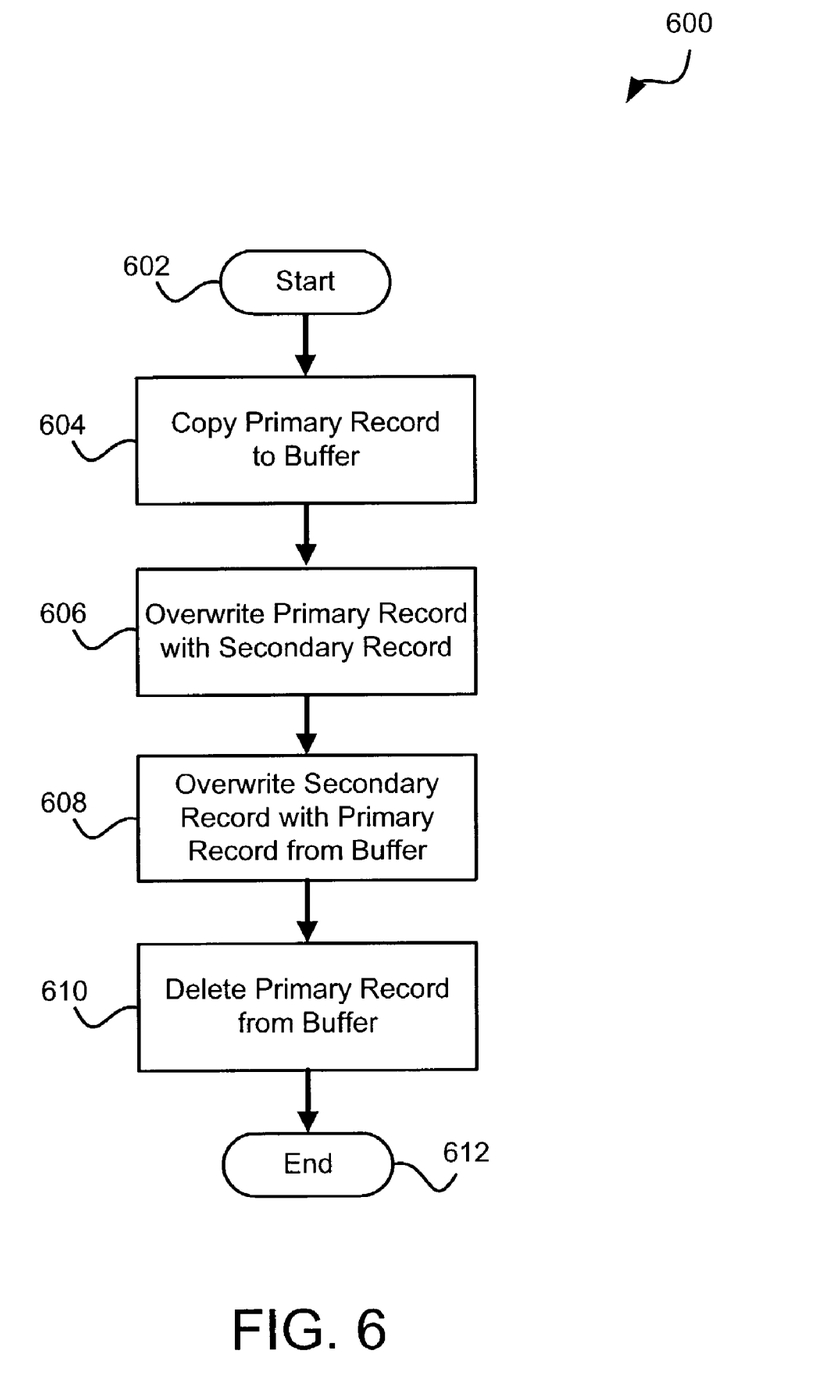
FIG. 6 is a schematic flow chart diagram illustrating one embodiment of a representative record swap method given by way of example of a record swap step of FIG. 5.

Referring to FIG. 6, a schematic flow chart diagram depicts one embodiment of a record swap method 600 given by way of example of the record swap step 512 of FIG. 5. Prior to swapping the primary and secondary records 340, the primary record 340 is preferably located in a root directory and the secondary record 340 is preferably located in a secondary directory distinct from the root directory.

The method 600 begins 602 by copying 604 the primary record 340 from a root record directory to a buffer. The buffer is preferably located on the DASD cache 210. The method 600 proceeds to copy the secondary record 340 and overwrite 606 the primary record 340 in the root directory with the secondary record 340. The secondary record 340 for a particular volume is assigned the same file name as the primary record 340, and therefore replaces the primary record 340 in the root directory. In a similar manner, the primary record 340 is copied from the buffer to the secondary directory to overwrite 608 the former secondary record 340. After record 340 overwriting 606 and 608 is complete, the method 600 deletes 610 the primary record 340 from the buffer and ends 612.

In one embodiment, the secondary record 340 is an exact copy of the primary record 340 with the exception of the logical volume to which it points. For example, the primary record 340 preferably points to a primary logical volume 320 stored on a primary physical volume 116. Similarly, the secondary record 340 preferably points to a secondary logical volume 320 stored on a secondary physical volume 116. The primary and secondary logical volumes 320 are preferably exact copies of one another. The primary and secondary physical volumes 116, on the other hand, are preferably distinct media cartridges 116 so that the physical loss of one cartridge 116 does not render inaccessible the logical volume 320 located on the second cartridge 116.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A data storage apparatus configured to store data from a host on a plurality of physical data storage media devices, the apparatus comprising:
    a local data storage cache within a dual copy data storage apparatus;
    a primary record stored on the cache;
    a secondary record stored on the cache; and
    a recovery module configured to implement a recovery action to recover a secondary logical volume in response to a failure to access a primary logical volume.

2. The apparatus of claim 1, wherein the primary record stored on the cache is configured to point to the primary logical volume.

3. The apparatus of claim 1, wherein the secondary record stored on the cache is configured to point to the secondary logical volume.

4. The apparatus of claim 1, wherein the primary record stored on the cache is located in a primary directory.

5. The apparatus of claim 4, wherein the secondary record stored on the cache is located in a secondary directory that is distinct from the primary directory.

6. The apparatus of claim 1, wherein the primary logical volume is stored on a primary physical data storage media device.

7. The apparatus of claim 1, wherein the secondary logical volume is stored on a secondary physical data storage media device.

8. The apparatus of claim 1, wherein the recovery action comprises overwriting the primary record with the secondary record.

9. The apparatus of claim 1, wherein the recovery module is further configured to implement the recovery action in a manner that is substantially transparent to the host.

10. The apparatus of claim 1, wherein the primary logical volume and the secondary logical volume are assigned an equivalent update level.

11. The apparatus of claim 1, wherein the plurality of physical data storage media devices further comprise tape cartridges.

12. The apparatus of claim 1, wherein the plurality of physical data storage media devices further comprise magnetic disks.

13. The apparatus of claim 1, wherein the plurality of physical data storage media devices further comprise optical disks.

14. The apparatus of claim 1, wherein the primary record and the secondary record are stored in a common directory.

15. A data storage apparatus configured to store data from a host on a plurality of physical data storage media devices, the apparatus comprising:
    a local data storage cache within a dual copy data storage apparatus;
    a primary logical volume stored on a primary physical data storage media device;
    a secondary logical volume stored on a secondary physical data storage media device;
    a primary record stored on the cache in a primary directory and configured to point to the primary logical volume;
    a secondary record stored on the cache and configured to point to the secondary logical volume;
    a recovery module configured to implement a recovery action to recover the secondary logical volume in response to a failure to access the primary logical volume; and
    the recovery module further configured to implement the recovery action in a manner that is substantially transparent to the host.

16. A data storage system configured to recover a logical volume, the system comprising:
    a dual copy data storage apparatus including a plurality of physical volumes;
    a host configured to request data access to a plurality of logical volumes stored on the plurality of physical volumes of the dual copy data storage apparatus;
    a recovery module configured to implement a recovery action to recover a secondary logical volume on a secondary physical volume in response to a failure to access a primary logical volume on a primary physical volume; and
    the recovery module further configured to implement the recovery action in a manner that is substantially transparent to the host.

17. The system of claim 16, wherein the dual copy data storage apparatus is a virtual tape server.

18. A method for recovering a logical volume in a data storage system, the method comprising:
    acknowledging a recall error generated in response to a failure to access a primary logical volume located on a primary physical volume;
    accessing a secondary record located on a cache within a dual copy data storage system; and
    recovering a secondary logical volume located on a secondary physical volume.

19. The method of claim 18, further comprising overwriting a primary record located on the system cache with the secondary record.

20. The method of claim 19, wherein the primary record is configured to point to the primary logical volume.

21. The method of claim 18, wherein the secondary record is configured to point to the secondary logical volume.

22. The method of claim 18, further comprising verifying that the primary logical volume and secondary logical volume are assigned an equivalent update level.

23. The method of claim 18, wherein recovering the secondary logical volume is performed in a manner that is substantially transparent to a host.

24. The method of claim 18, wherein the dual copy data storage system comprises a host and a virtual tape server.

25. A computer readable medium comprising a computer code configured to carry out a method for recovering a logical volume in a data storage system, the method comprising:

acknowledging a recall error generated in response to a failure to access a primary logical volume located on a primary physical volume;

accessing a secondary record configured to point to the secondary logical volume and located on a cache within a dual copy data storage system;

overwriting a primary record configured to point to the primary logical volume and located on the system cache with the secondary record; and recovering a secondary logical volume located on a secondary physical volume.

26. A data storage apparatus configured to store data from a host on a plurality of physical data storage media devices, the apparatus comprising:

means for acknowledging a recall error generated in response to a failure to access a primary logical volume located on a primary physical volume;

means for accessing a secondary record located on a cache within a dual copy data storage system;

means for overwriting a primary record located on the system cache with the secondary record; and means for recovering a secondary logical volume located on a secondary physical volume.

* * * * *

UNITED STATES PATENT AND TRADEMARK OFFICE
CERTIFICATE OF CORRECTION

PATENT NO.        : 7,080,277 B2                                                    Page 1 of 1
APPLICATION NO. : 10/231359
DATED             : July 18, 2006
INVENTOR(S)       : Josephina Anna, Kevin Lee Gibble and Gregory Tad Kishi

It is certified that error appears in the above-identified patent and that said Letters Patent is hereby corrected as shown below:

Title page (item 56) under References Cited the 11th cited reference is shown as "6,243,796 B1 6/2001 Otsuka............................ 711/159"
Should read --6,243,795 B1 6/2001 Yang et al.......................... 711/159--

Signed and Sealed this

Twenty-first Day of November, 2006

JON W. DUDAS
*Director of the United States Patent and Trademark Office*